(12) United States Patent
Tysowski et al.

(10) Patent No.: US 10,542,453 B2
(45) Date of Patent: Jan. 21, 2020

(54) AUTOMATIC FULL DOWNLOAD OF IMPORTANT EMAILS

(71) Applicant: BlackBerry Limited, Waterloo (CA)

(72) Inventors: Piotr Konrad Tysowski, Waterloo (CA); Andrey Feldman, Hamilton (CA)

(73) Assignee: BlackBerry Limited, Waterloo, Ontario (CA)

(*) Notice: Subject to any disclaimer, the term of this patent is extended or adjusted under 35 U.S.C. 154(b) by 221 days.

(21) Appl. No.: 14/867,453

(22) Filed: Sep. 28, 2015

(65) Prior Publication Data

US 2016/0021562 A1    Jan. 21, 2016

Related U.S. Application Data

(63) Continuation of application No. 12/802,765, filed on Jun. 14, 2010, now Pat. No. 9,148,302.

(51) Int. Cl.
*H04W 28/02* (2009.01)
*H04L 12/58* (2006.01)
*G06Q 10/10* (2012.01)
*H04W 24/08* (2009.01)

(52) U.S. Cl.
CPC ........ *H04W 28/0268* (2013.01); *G06Q 10/10* (2013.01); *G06Q 10/107* (2013.01); *H04L 51/06* (2013.01); *H04L 51/12* (2013.01); *H04L 51/14* (2013.01); *H04L 51/20* (2013.01); *H04L 51/22* (2013.01); *H04W 24/08* (2013.01); *H04L 51/26* (2013.01)

(58) Field of Classification Search
CPC ......... H04L 51/12; H04L 12/26; H04L 12/58; G06Q 10/107
See application file for complete search history.

(56) References Cited

U.S. PATENT DOCUMENTS

| | | | |
|---|---|---|---|
| 7,752,279 B2 | 7/2010 | Hardy et al. | |
| 7,814,195 B2 | 10/2010 | Dacosta | |
| 8,558,693 B2 * | 10/2013 | Martin ................. | G06Q 10/109 340/457 |
| 9,148,302 B2 | 9/2015 | Tysowski et al. | |
| 2003/0195937 A1 | 10/2003 | Kircher, Jr. et al. | |
| 2003/0224760 A1 | 12/2003 | Day | |
| 2005/0033863 A1* | 2/2005 | Tosey .................. | G06Q 10/107 709/248 |

(Continued)

OTHER PUBLICATIONS

Office Action dated Oct. 24, 2012, received for U.S. Appl. No. 12/802,765.

(Continued)

*Primary Examiner* — Nam T Tran
(74) *Attorney, Agent, or Firm* — Jose Gutman; Fleit Intellectual Property Law

(57) ABSTRACT

A mobile communication device, computer readable storage medium, and method for determining whether to download a full instance of an email. The mobile communication device determines a change in quality of service of wireless communication, and sends a request to completely download from an email server a full instance of an email, based on the mobile communication device determining that the change in quality of service of wireless communication indicates the mobile communication device is entering a poor wireless coverage area.

17 Claims, 6 Drawing Sheets

(56) References Cited

U.S. PATENT DOCUMENTS

| | | |
|---|---|---|
| 2005/0043015 A1 | 2/2005 | Muramatsu |
| 2006/0246878 A1 | 11/2006 | Khoury |
| 2007/0168430 A1 | 7/2007 | Brun et al. |
| 2008/0062881 A1 | 3/2008 | Martin et al. |
| 2008/0095049 A1* | 4/2008 | Bugenhagen ........... H04L 67/14 370/229 |
| 2008/0305747 A1* | 12/2008 | Aaron .................. H04B 17/309 709/219 |
| 2009/0006308 A1* | 1/2009 | Fonsen ............. G06F 17/30902 |
| 2011/0250902 A1 | 10/2011 | Huang et al. |

OTHER PUBLICATIONS

Office Action dated Apr. 25, 2012, received for U.S. Appl. No. 12/802,765.

\* cited by examiner

AUTOMATIC FULL DOWNLOAD OF IMPORTANT EMAILS

TECHNICAL FIELD

The invention relates generally to downloading emails to a mobile communication device and more particularly to downloading important emails to a communication device when service is suboptimal.

BACKGROUND

Communication devices that are capable of wireless communication and performing common applications, such as email, have become more popular. One such communication device is the Blackberry. When downloading email to such a device efficient use of device memory, battery-life and wireless bandwidth is always an important consideration. Still further, subscribers may want to have access to full emails, especially important emails, even when the communication device may be entering an area of bad service or no service.

DESCRIPTION OF THE DRAWINGS

Features of example implementations of the invention will become apparent from the description, the claims and the accompanying drawings in which:

DETAILED DESCRIPTION

As explained, a mobile communication device (MCD) such as a BlackBerry may be used for downloading and reading email as well as other voice and data applications. When using any wireless device, however, the use of limited resources such as battery-life, memory and the air interface are kept to a minimum. Thus when a user of a communication device downloads email, typically only a portion of the email is initially downloaded. For example, only a header or a 2 kilobyte (KB) portion of an email is initially downloaded. A remainder of the email may be downloaded to the device if, for example, a subscriber opens the email, or makes a specific request to download a remainder of the email.

The subscriber, however, may receive an important email and before the full email is downloaded, the subscriber may enter an airplane or an area of bad coverage. Because only a header or 2 KB first portion of the email is initially downloaded, the subscriber may only be able to see the header of the email. Once on the plane, the subscriber may not be able to download the full email if the MCD cannot receive good wireless coverage or due to aviation restrictions prohibiting the use of wireless devices. Thus, it would be advantageous if a full copy or full instance of important emails were fully downloaded before the subscriber entered the airplane or entered the area receiving poor wireless coverage. Herein, downloading a full instance of an email also comprises downloading any attachments that accompany the downloaded email. Thus, once the email is downloaded, the subscriber has access to both the downloaded email and any attachments associated with the downloaded email. Alternatively, it would be advantageous if the communication device, upon receiving an email would download a full instance of the email when the device is entering an area of limited coverage. Typically, an MCD receives superior coverage when near a local office network or home area. A home area, for example, could be defined as an area that provides an MCD superior wireless coverage. Thus if the MCD were away from an area near the office or outside the home area, it would be advantageous if the MCD would download a full instance of each received email. Still further, the user may want to have the option to configure the communication device to download a full instance of each email received regardless of the coverage or the importance of a received email. Wi-Fi access may provide the subscriber an opportunity to download emails free of data traffic costs or limits, roaming charges, etc. Thus, when the user enters an area providing cheap wireless access, such as Wi-Fi, the subscriber may want to have the option to download a full instance of each email.

Figure 1A:
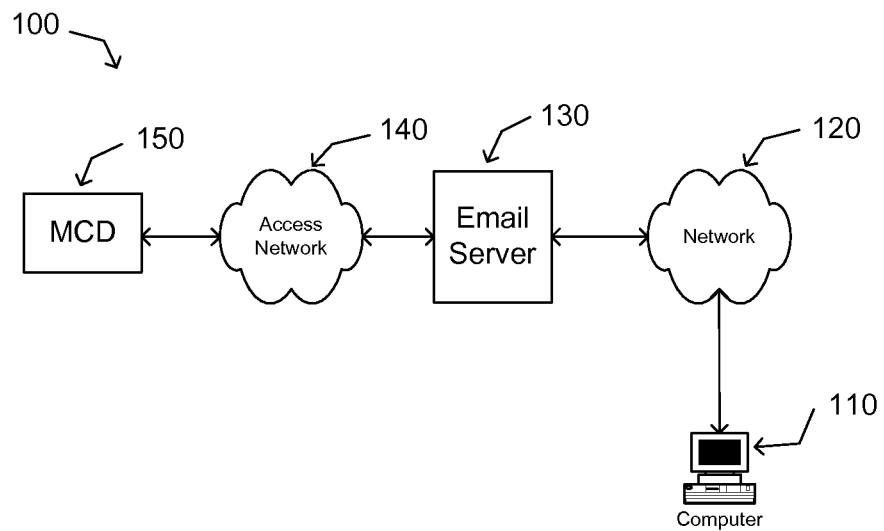
FIG. 1a is a representation of basic components of a network where the method and apparatus for automatic full download of important emails may reside.

Turning to FIG. 1a which is a system 100 in one example where the method and apparatus for automatic full download of important emails may reside. Hereinafter the method and apparatus for automatic full download of important emails is referred to as the method or the apparatus. The system 100 may comprise a general computing device or computer 110 for sending email, a generic network 120, an email server 130, an access network 140 and a communication device or mobile communication device 150.

The computer 110, for example, may be a desktop computer, a laptop, a mobile communication device or any other type of device that may be used to send or receive email. The computer 110 may be communicatively connected to the generic network 120. The generic network 120 may be an amalgam of networks that provide computers, such as the computer 110, access to the email server 130. The generic network 120 may comprise a network provided by an Internet service provider, as well as the Internet and various other wired and wireless communications networks that are used to access the email server 130.

The email server 130 may serve as an email server for the MCD 150. The email server 130 may be any type of computing equipment that may serve as an email server. The email server 130 may initiate sending emails from the email server 130 to the MCD 150. This is sometimes referred to as pushing email to the MCD 150. Alternatively, the MCD 150 may request that the email server 130 send it any emails which have yet to be delivered. This is sometimes referred to as pulling emails. In a pull-based mechanism, the email server 130 may determine which emails are to be fully downloaded and mark these emails for full download. Emails that are sent to the MCD 150 may pass through an access network 140. The access network 140 may comprise any type of equipment, wireless or wired, that is needed to provide a communication path between the MCD 150 and the email server 130.

Figure 1B:
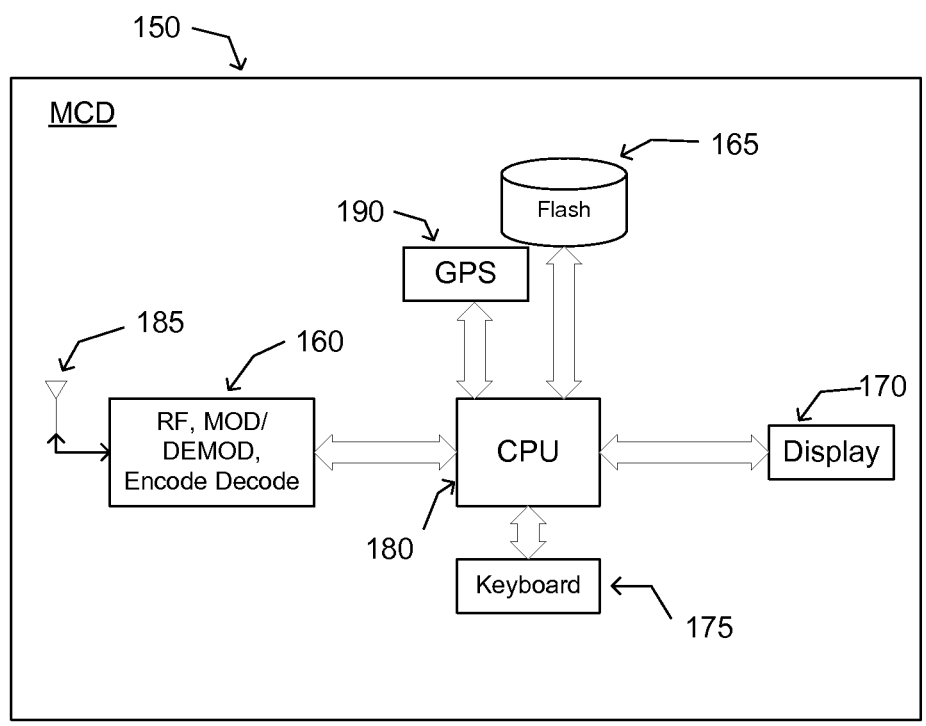
FIG. 1b is a representation of basic components of a communication device where the system and method for automatic full download of important emails may reside.

Turning to FIG. 1b which depicts a representation of basic components of the MCD 150. In an embodiment, the MCD 150 may be configured to comprise the method and apparatus. The MCD 150 may also comprise a radio frequency (RF) module 160, a persistent memory such as a flash memory 165, a display 170, a keyboard 175, a CPU 180 and a GPS module 190. The RF module 160 may be communicatively coupled to an antenna 185 that transmits and receives wireless communications. The RF module 160 may perform modulation and demodulation of radio signals as well as any encoding and decoding of the signals as needed. As voice and data are received, the antenna 185 may receive the voice and data, and the voice and data may pass through the RF module 160 and pass into the CPU 180.

The CPU 180 may comprise the bulk of the processing for voice and data applications. The CPU 180 may also comprise an email application that handles some general email processing. The CPU 180 may communicate voice and data to the RF module 160 to send uplink communications to a base station (not pictured). The CPU 180 may also be in communication with the keyboard 175. A subscriber may enter commands and information to the MCD 150 via the keyboard 175. The CPU 180 may also be in communication with a display 170. The display 170 may present information and data to the subscriber. The display 170 may be a touch display, and thus may also be used by the subscriber to communicate data and commands to the MCD 150. The CPU 180 may comprise volatile memory such as random access memory (RAM). The RAM of the CPU 180 may be used to store currently executing applications as well as variables and data needed for executing the applications. For example, an email application may store information in RAM associated with an email that is currently being read. The CPU 180 may also be operatively coupled to non-volatile memory such as the flash memory 165. The CPU 180 may store persistent and transient variables in the flash memory 165 for future use by an application. For example, the subscriber may enter a command to change options associated with the email application and the variables representing these options may be stored on the flash 165. The flash memory 165 may also be used to permanently store emails. Thus, emails that are read into RAM may be stored on flash memory 165 for later reference. The GPS module 190 may receive GPS signals from GPS receiver (not pictured) and translate those signals into messages destined for applications executing on the CPU 180.

User controlled variables may be variables that the user changes and adjusts. For example, there may be a variable that indicates whether a full instance of each email should be downloaded. The user may set this variable. User controlled variables may be stored in a subscriber profile or any other place variables associated with a subscriber may be stored. During execution of an email application the user controlled variables may be stored in RAM or in flash 165. Operator controlled variables may be variables that only the operator may adjust. During execution of an email application the operator controlled variables may also be stored in RAM or in flash 165. Further, permanent email options not associated with a subscriber may be stored in a place reserved for the method and apparatus. These permanent email options may remain unaffected if the MCD 150 is re-programmed for a different subscriber. In other words, these variables are akin to a global setting.

Figure 2:
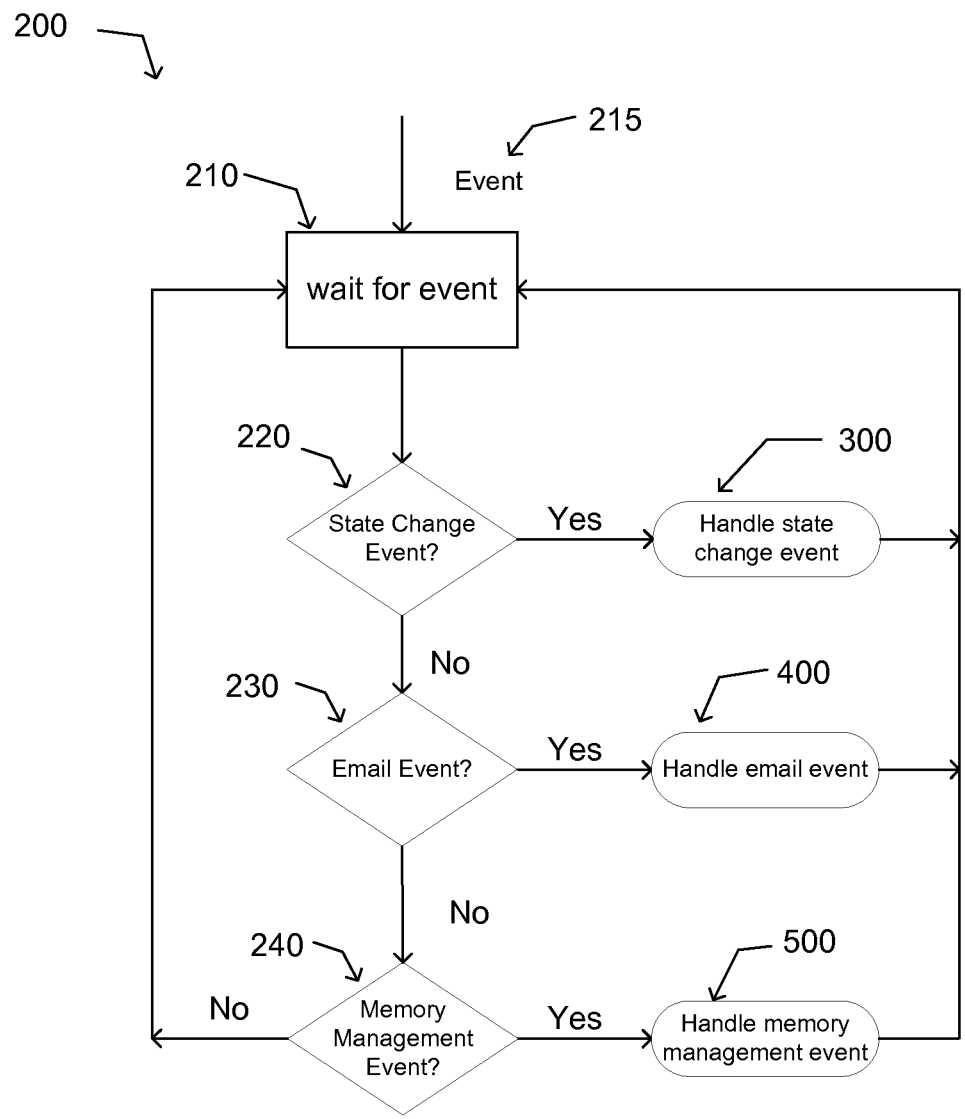
FIG. 2 is a representation of one logic flow for handling events in the method for automatic full download of important emails.

Turning now to FIG. 2 that depicts an event handler 200 that may comprise the method and apparatus. The method as well as the event handler 200 may be executed on the CPU 180. The event handler 200 may receive different events associated with handling email. Based on the received event, the event handler 200 may dispatch a specific event handler to process the received event. The events may be generated by the method, or from another application executing on the CPU or from external entities such as the keyboard 175, the display 170, the GPS module 190 or the RF module 160 of the MCD 150.

At 210 the event handler 200 waits for an event 215. At 220 the event handler determines if the received event 215 is a state change event. If the event 215 is a state change event, a state change event handler 300 is invoked. After the state change event handler 300 is invoked the event handler 200 continues to wait for events 210. If the event 215 is not a state change event 220, the event handler 200 determines if the event 215 is an email event 230. If the event 215 is an email event, an email event handler 400 is invoked and the event handler 200 continues to wait for events 210. If the event 215 is not an email event 230, the event handler 200 determines if the event 215 is a memory management event 240. If the event 215 is a memory management event 240, a memory management event handler is invoked 500 and the event handler continues waiting for events 210. If the event 215 is not a memory management event 240, the event 215 is not an event the event handler 200 is expecting, so the event handler waits for another event 210. The order of the events shown in FIG. 2 is just an example. The check for events could come in any order and the flow chart may be rearranged to accommodate a differing order. Thus, for example, the check for a state change event 220 could be performed last, and the check for a memory management event 240 could be performed first, etc.

Figure 3:
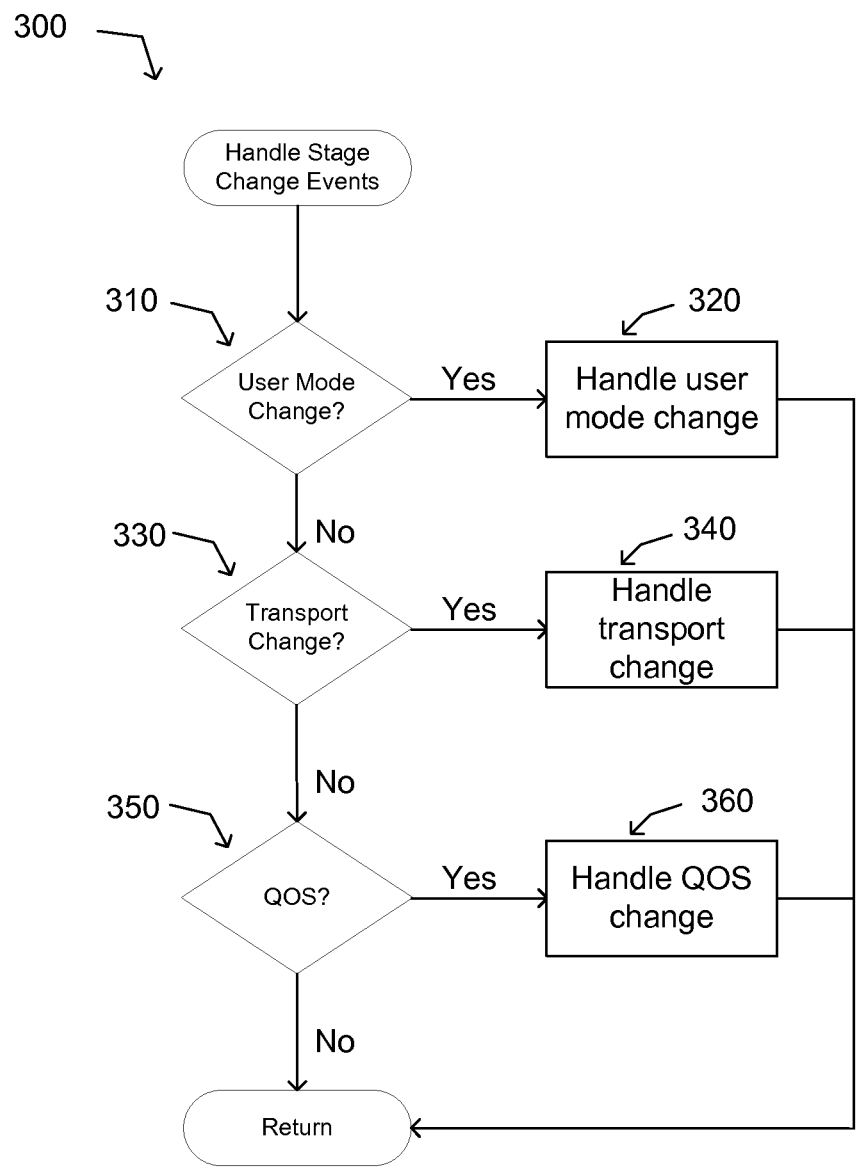
FIG. 3 is a representation of one logic flow for handling change events in the method for automatic full download of important emails.

Turning now to FIG. 3 that depicts the state change event handler 300 or a flow diagram for handling state change events that may be encountered by the method and apparatus. The state change event handler 300 may receive events, such as a user mode change event, a transport change event, or a quality of service (QOS) event. These events are described in further detail below.

At 310 the state change event handler 300 determines if a user mode change event is received. If a user mode change is received, the user mode change handler 320 is invoked. In an embodiment of the method and apparatus, a user mode change event may indicate that the communication device 150 went into airplane mode, download email mode or out of office mode.

As will be appreciated by one of ordinary skill in the art, a subscriber or user of an MCD such as the MCD 150 may be able to set different modes on the MCD 150. For example, the user may be able to enable a ring mode causing the MCD 150 to ring upon receipt of an incoming call. Or, before getting on an airplane, the user may be able to invoke an airplane mode causing the MCD 150 to halt all wireless transmission and reception while in the airplane mode. In an embodiment of the method and apparatus, the user may also be able to invoke a download email mode. When this mode is invoked, the MCD 150 downloads a full instance of each email received from the server 130. When the download email mode is not invoked, only a header or a first 2 KB portion of the email is downloaded from the email server 130. If the download email mode is invoked and the MCD 150 goes into airplane mode before a full instance of all emails on the MCD 150 are downloaded, a full instance of all emails are downloaded before the wireless transmissions are halted. In another embodiment, when the MCD 150 goes into airplane mode, wireless transmissions may continue for a predetermined amount of time before wireless transmissions are stopped. The wireless transmissions may be stopped regardless of whether all emails have been downloaded. In some systems, an email is only pulled from the email server once a pull timer has expired. In an embodiment, if the MCD goes into airplane mode the MCD 150 does not wait for the pull timer to expire, the MCD 150 immediately downloads the email.

In still another embodiment, the MCD 150 enters an out of the office mode when the MCD 150 is away from the office. A MCD 150 may be out of the office if the MCD 150 determines through the use of GPS module 190 that the MCD 150 has gone outside a predetermined radius or area that indicates that the MCD 150 is in the office. The GPS module 190 may send coordinates to an application running on the CPU 180, the application may then send an event to the state change event handler 300 when GPS signals indicate that the MCD 150 is not within the predetermined radius. In other embodiments, the state change event handler 300 may receive a user mode change event indicating that the MCD 150 is out of the office when the MCD 150 leaves a location area that is the home location area of the MCD 150. In still another embodiment, the user may manually set the out of office mode to indicate that the user is away from the office. In yet another embodiment, a state change event indicating that the MCD 150 is out of the office may be generated when the subscriber sets a vacation email option or vacation email auto-reply in his email settings. In still another embodiment, a state change event indicating that the MCD 150 is out of the office may be generated when the MCD 150 is roaming. In yet another embodiment, a state change event indicating that the MCD 150 is out of the office may be generated when a network time, received from a base station or other source, does not match a time zone set on the MCD 150. Because access fees may be greater when roaming, in different embodiments a subscriber may decide to configure the out of office mode so that the MCD 150 is not marked as out of office when the MCD 150 is roaming.

At 320, the user mode change is handled. Handling the user change mode may entail setting a variable in flash 165 or RAM of the CPU 180. If the user change mode event indicates that the MCD 150 is entering airplane mode, the event handler 300 may set a variable indicating that the MCD 150 has entered airplane mode. If the user change mode event indicates that the user invoked the download email mode, the event handler 300 may set a variable indicating that the MCD 150 has entered the download email mode. If the user change mode event indicates that the MCD 150 has entered out of office mode, the event handler 300 may set a variable indicating that the MCD 150 has entered out of office mode.

If the event is not a user change mode event 310, the state change handler 300 determines if a transport change occurred 330. A transport change event may occur when the MCD 150 moves into or out of an area that offers an economical transport medium. An area that offers an economical transport medium may be an area that offers wireless connection through WI-FI or some other type of local wireless LAN. In another embodiment, an economical transport area or mode may be recognized when the MCD 150 establishes a free wired connection, such as a universal serial bus (USB) connection through a computer. When the MCD 150 is in an area that offers economical transport, the subscriber may want to take advantage of the cheap transport and download a full version of each received email. Thus, when the MCD 150 begins using an economical transport, the economy transport mode is set (turned on). Similarly, when the MCD 150 stops using economical transport, the economy transport mode is reset (turned off). When the economy transport mode is on, emails received at the MCD 150 may be downloaded in full. The MCD 150 may set a variable in flash 165 or RAM of the CPU 180 to indicate that the MCD 150 is in economical transport mode.

If the event is not a transport event 330, the state change handler 300 may determine if the event is a quality of service event 350. A quality of service event may occur if the relative signal strength of the MCD 150 is poor, if the MCD 150 dropped a connection with wireless infrastructure too frequently or if the MCD 150 has dropped too many packets.

As one of ordinary skill in the art will readily appreciate, a mobile device such as MCD 150 is constantly monitoring a relative signal strength (RSS) or signal strength received from serving base stations. If the RSS slips below a certain level this may indicate that the MCD 150 is not receiving a sufficient signal from a serving base station, so the MCD 150 may attempt a handover to another base station. A handover, however, is not always successful. Thus, if the RSS of the MCD 150 slips below a certain level, the user may want to have all emails downloaded before the MCD 150 attempts a handover. Accordingly, the device may comprise an RSS threshold. When the RSS level of the MCD 150 slips below the RSS threshold, all unread or unopened emails currently on the MCD 150 that have not yet been fully downloaded, may be fully downloaded. This may be done when the state change event handler 300 handles a QOS change 360. In another embodiment, the user may set an email download number that indicates a number of the most recently received unread or unopened emails that should be downloaded if the RSS level of the MCD 150 slips below the RSS threshold. For example, the recent email download variable may be set to ten, if the RSS level of the MCD 150 slips below the RSS threshold, the MCD 150 may download the ten most recently received unopened or unread emails. In still another embodiment, the unread and unopened emails on the MCD 150 and received by the MCD 150 may be downloaded for a pre-configured amount of time after the RSS level of the MCD 150 slips below the RSS threshold. For example, if the RSS level of the MCD 150 slips below the RSS threshold and the pre-configured amount of time is five minutes, then for the next five minutes the unread and unopened emails on the MCD 150 may be fully downloaded.

Another type of QOS event (lost packets QOS event) may occur if the MCD 150 loses too many packets. The MCD 150 may maintain a lost packet threshold. The MCD 150 may track the number of lost packets it has encountered by incrementing a lost packet count each time a packet is dropped. When the lost packet count passes a lost packet threshold, this may indicate that the MCD 150 is not receiving good packet service. Thus the subscriber may want to download all unread or unopened emails currently on the MCD 150 before service is completely lost. Downloading emails when the lost packet threshold is exceeded may be done when the state change event handler 300 handles a QOS change 360. In one embodiment, the lost packet count may be reset at predefined intervals. When the predefined interval expires, the lost packet count is reset (set to 0) and the lost packet count resumes. Alternatively, the lost packet count may track the number of lost packets during a time window or a sliding time window. The full instance of emails on the MCD 150 is downloaded only if the lost packet count exceeds the lost packet threshold during the time window. In another embodiment, the user may set the email download number that indicates a number of the most recently received unread or unopened emails that should be downloaded if a lost packets QOS event occurs. For example, the recent email download variable may be set to ten, if a lost packets QOS event occurs, the MCD 150 may download the ten most recently received unopened or unread emails. In still another embodiment, the unread and unopened emails on the MCD 150 and received by the MCD 150 may be downloaded for a pre-configured amount of time. For example, if a lost packets QOS event occurs and the pre-configured amount of time is five minutes, then for the next five minutes the unread and unopened emails on the MCD 150 and received by the MCD 150 may be fully downloaded.

Still another type of QOS event (lost connections QOS event) may occur if the MCD 150 loses connection with a base station too many times. The MCD 150 may maintain a lost connections threshold. The MCD 150 may track the number of times it loses a connection with a base station by incrementing the lost connections count each time the MCD 150 loses a connection with a base station. The MCD 150 may track the number of lost connections using a lost connections count. If the lost connections count exceeds the lost connections threshold, all unread or unopened emails currently on the MCD 150 that have not been fully downloaded, may be fully downloaded. The MCD 150 may continue fully downloading emails for a lost connection interval. When the lost connection interval has expired, the MCD 150 may continue downloading emails in the manner the MCD 150 was downloading before the lost connection threshold was exceeded. In another embodiment, the user may set the email download number to indicate a number of the most recently received unread or unopened emails that may be downloaded if a lost connections QOS event occurs. For example, the recent email download variable may be set to ten, if a lost connections QOS event occurs, the MCD 150 may download the ten most recently received unopened or unread emails. In still another embodiment, the received unread and unopened emails on the MCD 150 may be downloaded for a pre-configured amount of time a lost connections QOS event occurs. For example, if a lost connections QOS event occurs and the pre-configured amount of time is five minutes, then for the next five minutes the unread and unopened emails on the MCD 150 and received by the MCD 150 may be fully downloaded. The order of the events shown in FIG. 3 is just an example. The check for change events could come in any order and the flow chart may be rearranged to accommodate the differing order.

Figure 4:
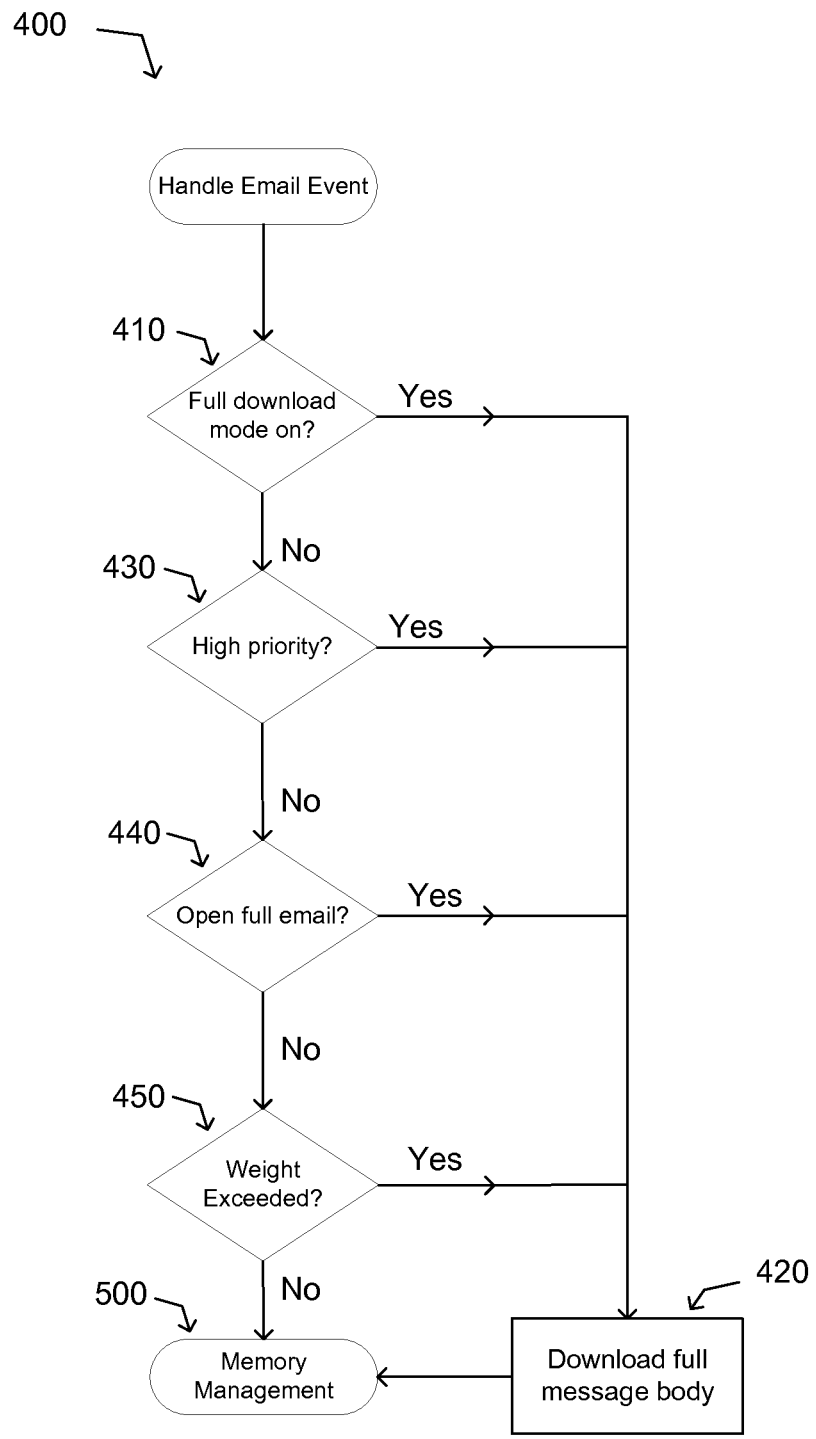
FIG. 4 is a representation of one logic flow for handling email events in the method for automatic full download of important emails.

Turning now to FIG. 4 that depicts a flow diagram for the email event handler 400 for handling email events in the method and apparatus. An email event may occur when the MCD 150 receives an email. The email event handler 400 first determines if a download email mode is on 410. Whether the download email mode is on may be determined by a user-controlled variable. The user may set this variable via the display 170 or keyboard 175 when the user wants a full instance of each email downloaded as the email is received. If the download email mode is on and an email is received (i.e., an email event occurs), a full instance of the email is downloaded 420.

If the download email mode is not on, the email event handler 400 determines if the email is a high priority email 430. If the email is of high priority, a full instance of the email is downloaded 420. The email event handler 400 may determine if an email is of high priority a number of different ways. For example, an email sent with Microsoft outlook may be sent with the high importance flag set. Emails sent with other email applications may have a similar marking. If the email event handler 400 receives an email marked with high importance, the email may be considered high priority and a full instance of the email may be downloaded 420 to the MCD 150. The email event handler 400 may also determine if an email is of high priority by parsing the subject line of a received email for keywords or phrases which indicate that the email is of high priority. For example, if the subject line of an email contains words such as urgent, important, high priority or other words or phrase like this, the email event handler 400 may download a full instance of the email 420. It should be noted that a subscriber may set the keywords that may are searched to indicate that an email is high priority. In still another example, if the email belongs to an active thread of emails, then subsequent emails belonging to that thread may be marked as important. Herein, a thread of emails may be emails that share a same subject line, or an email that references a same parent message. An active thread may be a thread of emails where the subscriber has performed an action, such as forwarding or replying on an email in the thread.

In another example, the email event handler 400 may parse the first 2 KB of a received email to determine if the email contains phrases or keywords that indicate that the email is of high priority. For example, the first 2 KB of an email may contain the words immediate, urgent or the phrase high priority or immediate attention. If words or phrases like these are found in the first 2 KB of an email, the email event handler 400 may download a full instance of the email 420. In still another example, a subscriber may maintain a list of senders that the subscriber considers important. This important senders list may be kept and organized by the user. If the email event handler 400 receives an email from a sender that is on the important senders list, the email may be considered important and a full instance of the email may be downloaded 420.

If the email is not of high priority 430, the email event handler 400 determines if an opened email event has occurred 440. An opened email event occurs when a subscriber opens an email to read. Typically, when an email is opened on a wireless device like the MCD 150, an initial portion of the email is downloaded before the full email is downloaded. As the user scrolls through the email, remaining portions of the email are downloaded to the MCD 150. Thus, for example, an initial portion of an email may be downloaded, once the subscriber scrolls past this initial portion, a next portion of the email may be downloaded. If, however, the user has set a download opened email mode, when the subscriber opens an email, a full instance of the email is downloaded immediately rather than downloading portions of the email as the user reads the email.

If the event is not an open email event 440, the email event handler 400 determines if an email download weight has exceeded an email download threshold 450. A subscriber may set an email download threshold and if an email download weight exceeds the email download threshold, a full instance of the email is downloaded 420. The email download weight may be increased depending on events that occur. For example, a user may set the email download threshold at 5. The method may be configured so that if an email of moderate priority is received the email download weight is incremented by two, if the RSS is a certain level the email the download weight may be increased another two, if the MCD 150 has lost a predefined number of packets over a predefined interval the email download weight may be increased another three. Still further, the check to determine if the download weight is exceeded could be include factors such as, for example, the priority of the email. As will be readily appreciated, this is not an exhaustive list of events that may contribute to a download weight and the email download weight may be tied to any number of different variables or events comprising an email application of the MCD 150. If the email download weight exceeds the email download threshold 450, a full instance of the email is downloaded 420. After a full instance of the email is downloaded, or if the email event is not a weight exceeded event 450, a memory management event handler 500 is invoked.

In the embodiment depicted, the method first determines if the download email mode is on 410, whether the email is of high priority 430 and whether the event is an open email event 440, before the method determines if the download weight is exceeded 450. Thus, the method may not determine if the download weight is exceeded 450 if either of the previous checks 410, 430, 440 are true. The order of the events shown in FIG. 4, however, is just an example. The check for email events could come in any order and the flow chart may be rearranged to accommodate the differing order. Thus, the check for download email mode 410 could be performed last and the check for weight exceeded could be performed first 450, etc.

Figure 5:
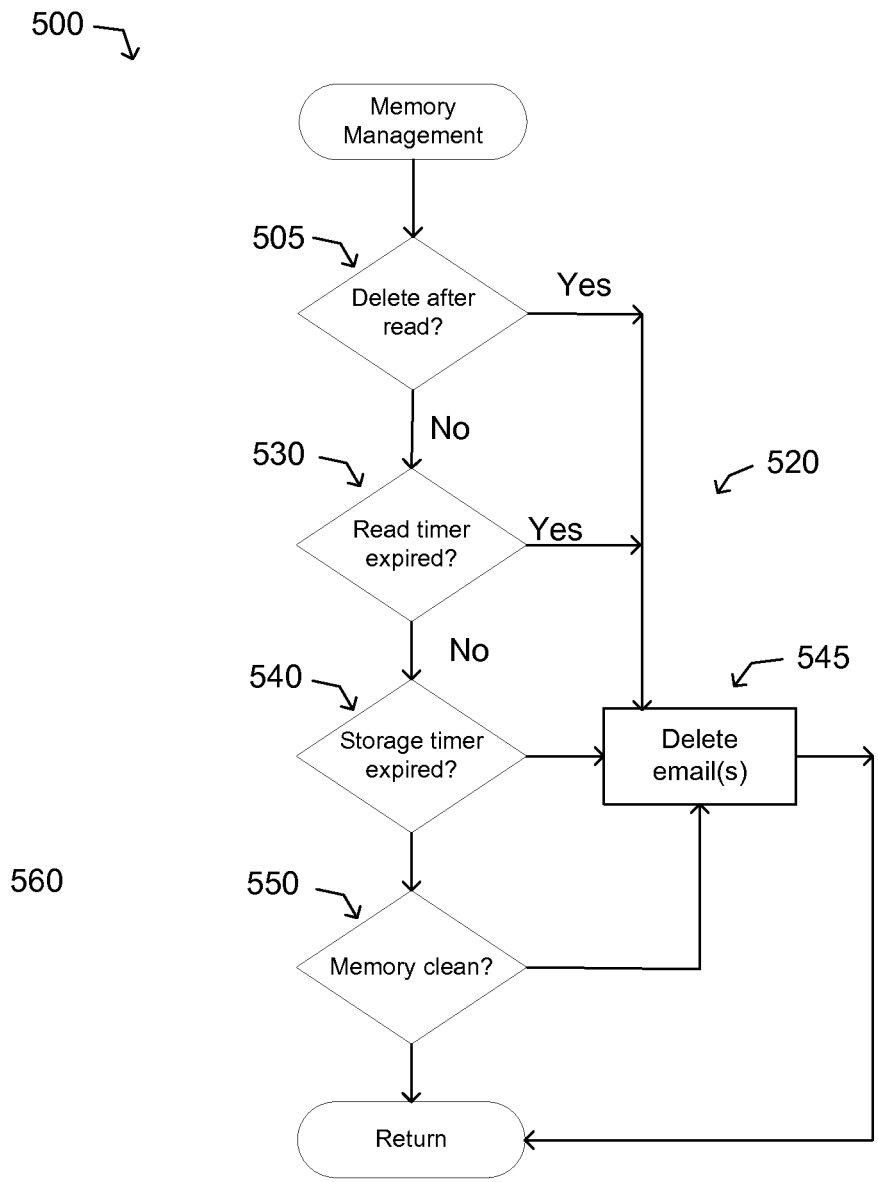
FIG. 5 is a representation of one logic flow for handling memory management events in the method for automatic full download of important emails.

Turning now to FIG. 5 that depicts a flow diagram for the memory management event handler 500 that may handle memory management events in the method and apparatus. The memory management event handler 500 first determines if this is a delete read email event 505. The method may comprise a delete read email mode that may indicate that emails should be deleted after the email is read. The delete read email mode may be user configurable. In an example, the method does not delete the full email, but instead leaves a header or a first 2 KB block of the email for future reference. If the delete read email mode is set or on, the memory management event handler 500 may consider the last opened email to be the last read email, and thus delete the last opened email 545.

If this is not a delete read email event, the memory management event handler 500 determines if this is a read timer expiration event 530. Each email that is fully downloaded (i.e., the complete email and not just the first 2 KB is downloaded) and stored on the MCD 150 may have an associated read timer. The read timer may be set when an email is downloaded or when an email has just been read. If the email is subsequently opened and read, the timer is reset. If, however, the timer expires before the email is read or deleted, a read timer expiration event is generated and sent to the memory management event handler. When the timer expires, the first two KB of the message body and any attachments of any email associated with the timer is deleted 545. In another embodiment, when the timer expires, the first two KB of the message body is retrained, but the remaining message body and any attachments are deleted.

If the event is not a delete read timer expiration event, the memory management event handler 500 determines if the event is a storage timer event 540. Each email stored on the MCD 150 may have an associated storage timer. The storage timer may be set for a predetermined time interval as an email is stored on the MCD 150. When the storage timer expires, regardless of whether the email was read since the storage timer was set, a body of the email associated with the storage timer may be deleted 545.

If the event is not a storage timer event, the memory management event handler 500 determines if the event is a clean email memory event 550. In an embodiment, the method may maintain a clean email memory variable. The clean email memory variable may represent an amount of memory, either RAM on the CPU 180 or flash memory 165, available for storage of emails and other application needs. If the amount of memory available for storage falls below a predefined email memory threshold, the method may generate a clean email memory event. Upon receipt of a clean email memory event, the memory management event handler 500 may free up more memory for emails and other applications by going through memory and deleting the body of any email that is currently stored in memory 545. Oldest emails may be deleted first, and emails may deleted until a predefined amount of memory is freed. Although, the body of emails comprising the MCD 150 may be deleted, a header or initial 2 KB portion of the email may remain undeleted.

Figure 6:
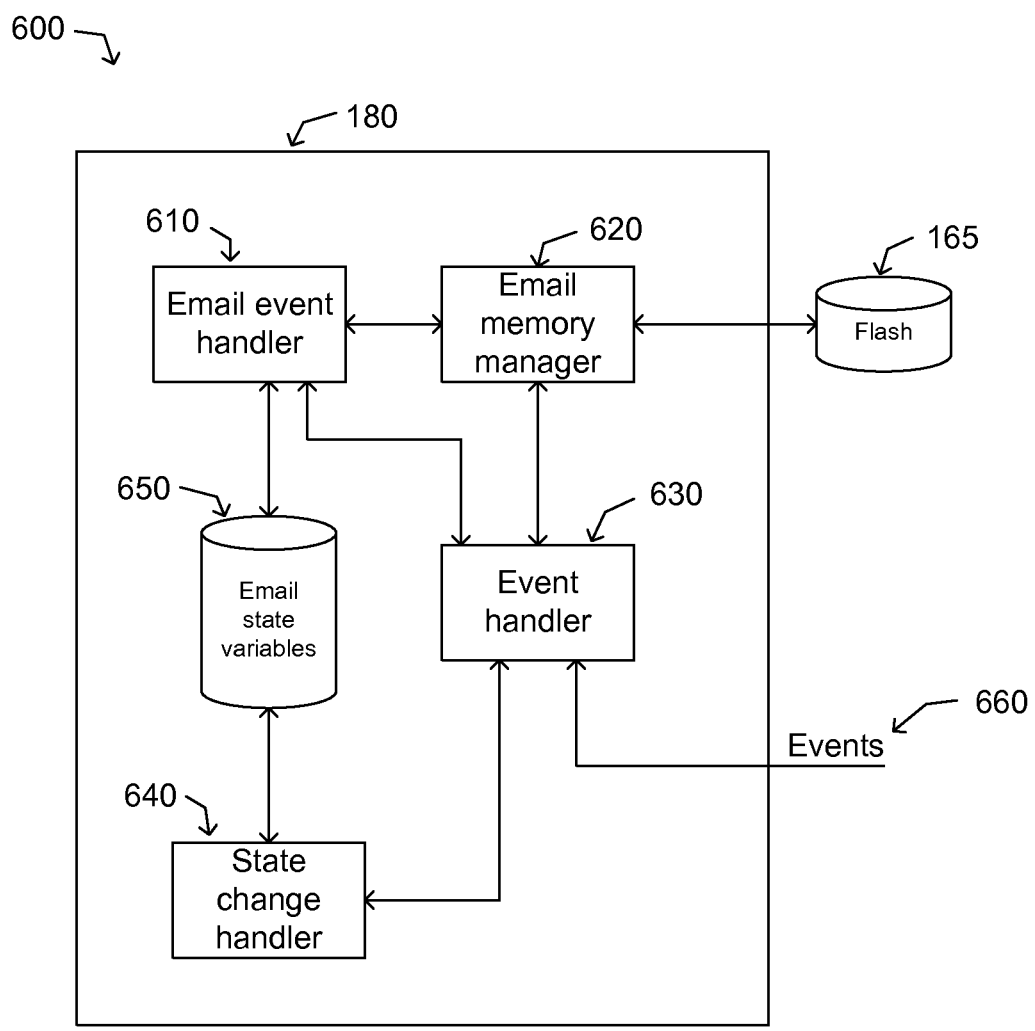
FIG. 6 is a representation of an apparatus that may be used in executing the method automatic full download of important emails.

Turning now to FIG. 6 that depicts an apparatus 600 that may be used to perform the method. In one embodiment, the apparatus may reside on the CPU 180 of the MCD 150. The apparatus 600 may comprise an email event handler 610, an email memory manager 620, an event handler 630, a state change handler 640 and a database of email state variables 650. The event handler 630 may be communicatively coupled with the email memory manager 620, the email event handler 610 and the state change handler 640. The email memory manager 620 may also be operatively coupled with the flash 165 and communicatively coupled the email event handler 610. The email event handler 610 may be operatively coupled with the email state variables database 650. The state change handler 640 may also be operatively coupled with the email state variables database 650. The email state variables database 650 may comprise user controlled and system controlled variables related to events processed during automatic full download of important emails.

Events may be sent to the event handler 630. The events may be generated by the method, or from another application executing on the CPU or from external entities such as the keyboard 175, the display 170, the GPS module 190 or the RF module 160 of the MCD 150. Upon receipt of an event, the event handler 630 may determine how to distribute the event in the same manner as the event handler described in relation to FIG. 2. Thus, if the event handler 630 receives a state change event, the event handler 630 communicates the event to the state change handler 640. If the event handler 630 receives a memory management event, the event handler 630 communicates the event to the memory management event handler 620. If the event handler 630 receives an email event 610, the event handler 630 communicates the event to the email event handler 610.

Upon receipt of a state change event, the state change handler 640 processes the event in the same manner described in relation to the stage change handler 300 of FIG. 3. Upon receipt of an email event, the email event handler 610 processes the event in the same manner as described in relation to the email event handler 400 of FIG. 4. Upon receipt of a memory management event, the memory management event handler 620 processes the event in the same manner described in relation to the memory management event handler 500 of FIG. 5.

Although the method and apparatus for automatic download of important email messages may be performed on an MCD, in other embodiments an email server, such as the email server 130 of FIG. 1 may be configured to execute the method and apparatus. When configured as such, the email server 130 may comprise user controlled variables that are associated with an individual subscriber profile. The user controlled variables may be downloaded from a subscriber profile.

In one embodiment, an email application running on the MCD 150 requests the header or a first 2 KB portion of an email to be downloaded to the MCD 150, while the email server 130 may determine if a full instance of the email should be pushed to the MCD 150. The email server 130 may make this determination based on user controlled variables and operator controlled variables. User controlled variables may be stored in a subscriber profile that is associated with an MCD. When an email arrives for a particular subscriber, the server 130 may be able to retrieve a subscriber profile associated with the MCD to determine any associated user controlled variables.

An example of a user controlled variable may be a push email variable. If the push email variable is on (set to true), when the email server 130 receives a request from the MCD 150 to download a portion of an email, the email sever 130 may push a full instance of the email to the MCD 150.

The email server 130 may also push a full instance of high priority emails. When the email server 130 receives an email, the email server may parse the whole email. If the email contains words or phrases such as "urgent" or "immediate action required" etc., a full instance of the email may be pushed to the MCD 150. The user may determine phrases and words which indicate that an email is high priority. In still another embodiment, the email server 130 may determine if the email is marked as high priority. An email may be marked as high priority if, for example, a sender flagged the email with high importance in Microsoft Outlook. Or, the user flagged the email with high importance using some other email application. If the server 130 determines that the email is of high priority, the server 130 may push a full instance of the email to the MCD 150. If the e-mail download mechanism is pull-based and the email server 130 determines that the email is of high priority, the email server 130 may mark the email for full download on the next pull attempt. In still another embodiment, the server 130 may determine an order in which to push important emails. For example, the server 130 may push the oldest emails first. Or the most important emails may be pushed based on the sender, thus the server 130 may push work emails first, or the server 130 may push emails from people on a friends list first.

The apparatus 600 in one example comprises a plurality of components such as one or more of electronic components, hardware components, and computer software components. A number of such components can be combined or divided in the apparatus 600. An example component of the apparatus 600 employs and/or comprises a set and/or series of computer instructions written in or implemented with any of a number of programming languages, as will be appreciated by those skilled in the art.

The apparatus 600 in one example employs one or more computer-readable signal-bearing media. The computer-readable signal-bearing media store software, firmware and/or assembly language for performing one or more portions of one or more implementations of the invention. The computer-readable signal-bearing medium for the apparatus 600 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method, with a mobile communication device, for determining whether to download a full instance of an email, the method comprising:
   receiving, by the mobile communication device, one or more wireless communication signals from a wireless communication infrastructure through which the mobile communication device is configured to receive email messages;
   monitoring, by the mobile communication device, one or more quality of service (QoS) wireless communication parameters associated with the received wireless communication signals, to determine if at least one of the one or more QoS wireless communication parameters exceeds a respective predefined threshold thereby indicating poor quality of service communication for the mobile communication device and that the mobile communication device is entering a poor wireless coverage area for the wireless communication infrastructure, the QoS wireless communication parameters including at least one of:
   the relative signal strength of the received signals,
   one or more dropped connections with the wireless communication infrastructure, or
   one or more dropped communication packets during communication with the wireless communication infrastructure;
   automatically, in response to detecting occurrence of a QoS event defined by the monitored one or more QoS wireless communication parameters exceeding the respective predefined threshold, sending a request, from the mobile communication device to the wireless communication infrastructure, to completely download to the mobile communication device from an email server a full instance of all unread or unopened emails that are currently stored in the mobile communication device and that have not yet been fully downloaded; and
   while not detecting occurrence of a QoS event, receiving unread or unopened emails as configured in the mobile communication device and not sending the request.

2. The method of claim 1, wherein the monitoring to determine if at least one of the one or more QoS wireless communication parameters exceeds a respective predefined threshold, comprises at least one of
   determining that a relative signal strength value of a wireless communication signal received at the mobile communication device changes to below a relative signal strength threshold;
   determining that a lost packet count at the mobile communication device based on monitoring the wireless communication changes to exceed a lost packet threshold during a time window; and
   determining that a lost connections count at the mobile communication device based on monitoring the wireless communication changes to exceed a lost connections threshold during a time interval.

3. The method of claim 2, further comprising:
monitoring, with the mobile communication device, at least one of
- a relative signal strength value of a signal received from at least one base station;
- a number of times that a packet communicated with a base station is dropped, represented by a lost packet count, over a time window; and
- a number of times that a connection with a base station is lost, represented by a lost connections count, over a time interval.

4. The method of claim 1, wherein the monitoring to determine if at least one of the one or more QoS wireless communication parameters exceeds a respective predefined threshold, comprises determining that a relative signal strength value of a wireless communication signal received at the mobile communication device from at least one base station, changes to below a relative signal strength threshold.

5. The method of claim 1, wherein the monitoring to determine if at least one of the one or more QoS wireless communication parameters exceeds a respective predefined threshold, comprises determining that a lost packet count at the mobile communication device changes to exceed a lost packet threshold during a time window.

6. The method of claim 5, wherein the determining that a lost packet count at the mobile communication device changes to exceed a lost packet threshold during a time window, comprises determining a number of times that a packet communicated with a base station is dropped, represented by a lost packet count, over a time window.

7. The method of claim 1, wherein the monitoring to determine if at least one of the one or more QoS wireless communication parameters exceeds a respective predefined threshold, comprises determining that a lost connections count at the mobile communication device monitoring the wireless communication changes to exceed a lost connections threshold during a time interval.

8. The method of claim 7, wherein the determining that a lost connections count at the mobile communication device monitoring the wireless communication changes to exceed a lost connections threshold during a time interval, comprises determining a number of times that a connection with a base station is lost, represented by a lost connections count, over a time interval.

9. The method of claim 1, further comprising:
sending the request, based at least on receiving at least one of a header of an email or a first block of the email stored on the mobile communication device.

10. The method of claim 9, wherein an email application running on the mobile communication device receives the at least one of a header of an email or a first block of the email, and the email application sends the request.

11. The method of claim 1, further comprising:
sending the request, in response to detecting the occurrence of the QoS event and based at least on a recent email download variable in the mobile communication device indicating a number of the most recently received unread or unopened emails that should be downloaded, to completely download to the mobile communication device from the email server a full instance of all, up to the number indicated by the recent email download variable, of the most recently received unread or unopened emails that are currently stored in the mobile communication device and that have not yet been fully downloaded.

12. A mobile communication device comprising:
a memory;
an RF module communicatively coupled to an antenna; and
a central processing unit (CPU), coupled to the memory and the RF module, the CPU being responsive to executing computer instructions, performs operations comprising:
- receiving, by the mobile communication device, one or more wireless communication signals from a wireless communication infrastructure through which the mobile communication device is configured to receive email messages;
- monitoring, by the mobile communication device, one or more quality of service (QoS) wireless communication parameters associated with the received wireless communication signals, to determine if at least one of the one or more QoS wireless communication parameters exceeds a respective predefined threshold thereby indicating poor quality of service communication for the mobile communication device and that the mobile communication device is entering a poor wireless coverage area for the wireless communication infrastructure, the QoS wireless communication parameters including at least one of:
  - the relative signal strength of the received signals,
  - one or more dropped connections with the wireless communication infrastructure, or
  - one or more dropped communication packets during communication with the wireless communication infrastructure;
- automatically, in response to detecting occurrence of a QoS event defined by the monitored one or more QoS wireless communication parameters exceeding the respective predefined threshold, sending a request, from the mobile communication device to the wireless communication infrastructure, to completely download to the mobile communication device from an email server a full instance of all unread or unopened emails that are currently stored in the mobile communication device and that have not yet been fully downloaded; and
- while not detecting occurrence of a QoS event, receiving unread or unopened emails as configured in the mobile communication device and not sending the request.

13. The mobile communication device of claim 12, wherein the CPU, responsive to executing computer instructions, performs operations comprising:
monitoring to determine if at least one of the one or more QoS wireless communication parameters exceeds a respective predefined threshold,
based on at least one of:
- determining that a relative signal strength value of a wireless communication signal received at the mobile communication device changes to below a relative signal strength threshold;
- determining that a lost packet count at the mobile communication device monitoring the wireless communication changes to exceed a lost packet threshold during a time window; and
- determining that a lost connections count at the mobile communication device monitoring the wireless communication changes to exceed a lost connections threshold during a time interval.

14. The mobile communication device of claim 13, wherein the CPU, responsive to executing computer instructions, performs operations comprising monitoring at least one of:
- a relative signal strength value of a signal received from at least one base station;
- a number of times that a packet communicated with a base station is dropped, represented by a lost packet count, over a time window; and
- a number of times that a connection with a base station is lost, represented by a lost connections count, over a time interval.

15. A non-transitory computer readable storage medium comprising computer instructions which, responsive to being executed by a central processing unit (CPU) of a mobile communication device, cause the CPU to perform operations comprising:
- receiving, by the mobile communication device, one or more wireless communication signals from a wireless communication infrastructure through which the mobile communication device is configured to receive email messages;
- monitoring, by the mobile communication device, one or more quality of service (QoS) wireless communication parameters associated with the received wireless communication signals, to determine if at least one of the one or more QoS wireless communication parameters exceeds a respective predefined threshold thereby indicating poor quality of service communication for the mobile communication device and that the mobile communication device is entering a poor wireless coverage area for the wireless communication infrastructure, the one or more wireless communication parameters including at least one of:
  - the relative signal strength of the received signals,
  - one or more dropped connections with the wireless communication infrastructure, or
  - one or more dropped communication packets during communication with the wireless communication infrastructure;
- automatically, in response to detecting occurrence of a QoS event defined by the monitored one or more QoS wireless communication parameters exceeding the respective predefined threshold, sending a request, from the mobile communication device to the wireless communication infrastructure, to completely download for up to a pre-configured amount of time, to the mobile communication device from an email server a full instance of all unread or unopened emails that are currently stored in the mobile communication device and that have not yet been fully downloaded; and
- while not detecting occurrence of a QoS event, receiving unread or unopened emails as configured in the mobile communication device and not sending the request.

16. The computer readable storage medium of claim 15, wherein the monitoring to determine if at least one of the one or more QoS wireless communication parameters exceeds a respective predefined threshold, comprises at least one of
- determining that a relative signal strength value of a wireless communication signal received at the mobile communication device changes to below a relative signal strength threshold;
- determining that a lost packet count at the mobile communication device based on monitoring the wireless communication changes to exceed a lost packet threshold during a time window; and
- determining that a lost connections count at the mobile communication device based on monitoring the wireless communication changes to exceed a lost connections threshold during a time interval.

17. The computer readable storage medium of claim 16, comprising computer instructions which, responsive to being executed by a central processing unit (CPU), cause the CPU to perform operations comprising:
- monitoring, with the mobile communication device, at least one of
  - a relative signal strength value of a signal received from at least one base station;
  - a number of times that a packet communicated with a base station is dropped, represented by a lost packet count, over a time window; and
  - a number of times that a connection with a base station is lost, represented by a lost connections count, over a time interval.

* * * * *